July 8, 1941.  H. T. FAUS  2,248,616
TELEMETERING SYSTEM
Filed Jan. 28, 1939
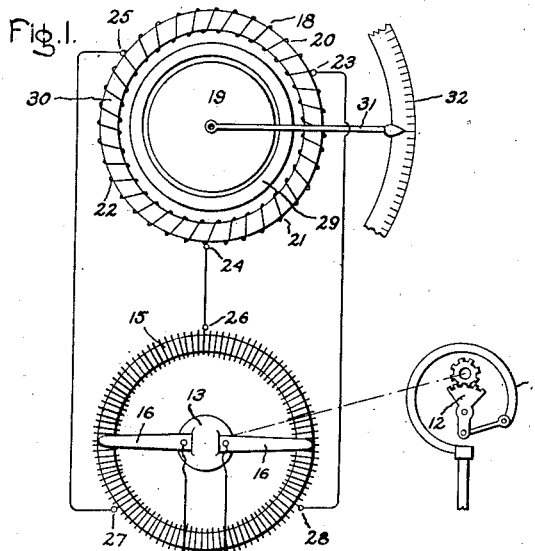
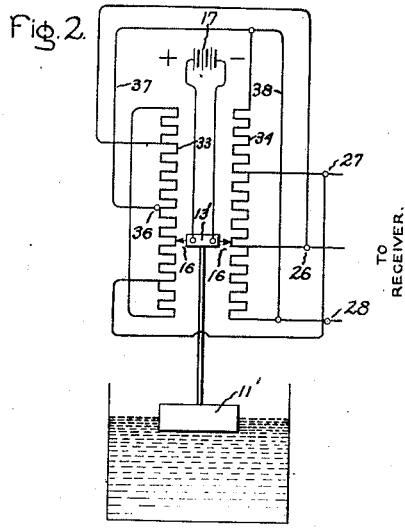
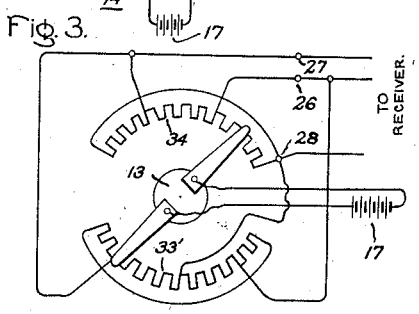
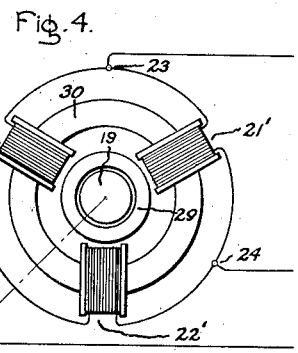
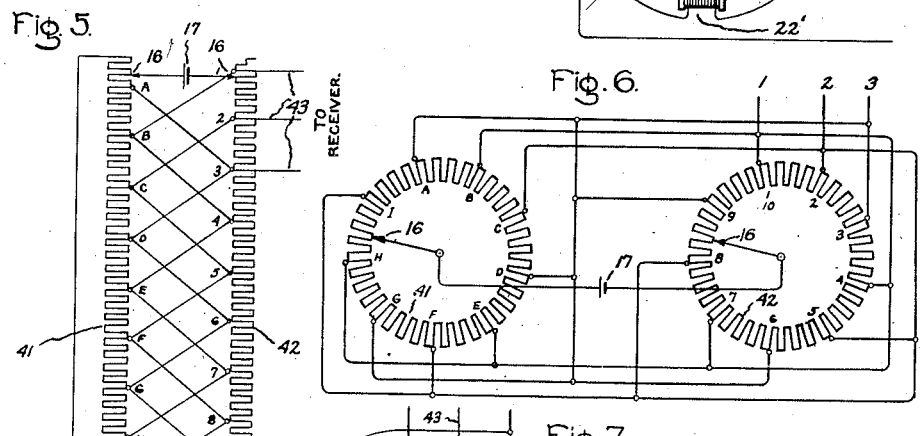
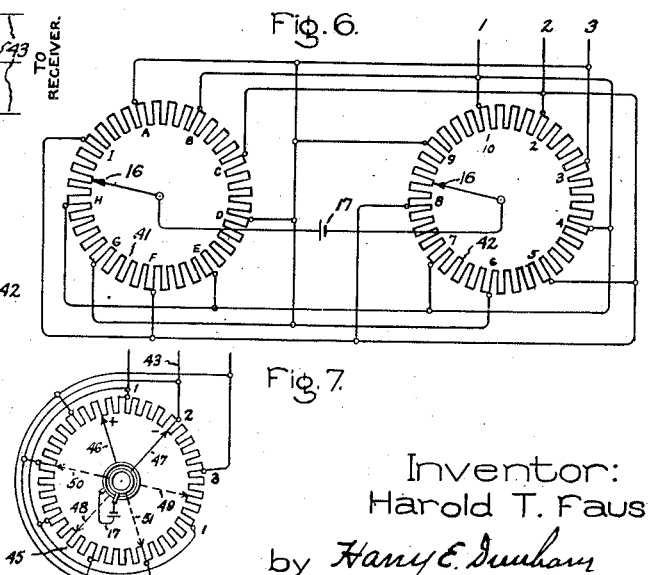
Inventor:
Harold T. Faus,
by Harry E. Dunham
His Attorney.

Patented July 8, 1941

2,248,616

UNITED STATES PATENT OFFICE 2,248,616

TELEMETERING SYSTEM

Harold T. Faus, Lynn, Mass., assignor to General Electric Company, a corporation of New York Application January 28, 1939, Serial No. 253,368

8 Claims. (Cl. 172—239)

My invention relates to telemetering systems and concerns particularly arrangements for electrically transmitting mechanical motions either of rotation or deflection.

The present application is a continuation-in-part of my copending applications Serial No. 80,782, filed May 20, 1936, and Serial No. 238,851, filed November 4, 1938 now Patent 2,181,803, November 28, 1939.

It is an object of my invention to provide a sturdy, compact, reliable receiver for electric systems, particularly one which, though small in size, may produce a high torque and be well damped.

It is also an object of my invention to provide a transmitting system in which a plurality of revolutions may be produced at a receiving station in response to rectilinear motion or motion through a small angle at a transmitting station.

Other and further objects and advantages will become apparent as the description proceeds.

Telemetric systems in which a deflection or a rotation may be reproduced at a distance are applicable to the transmission of numerous types of measurements. For example, in electrical tachometers, the movable arm of a sending unit may be operated by a centrifugal device similar to that in a centrifugal tachometer. Remote temperature indication may take place with a bimetallic strip or a Bourdon tube actuating the movable arm of the sending instrument. In liquid level indicators for water, oil, and gasoline tanks, a float would be provided for actuating the movable arm of the transmitting instrument. Similarly the positions of valves, controls, weather vanes, etc., may be remotely indicated by having connections to the movable arm of a transmitting instrument. In conjunction with Venturi tubes or standard orifices and suitable mechanical devices actuated by differential pressure, the movable arm of the transmitting instrument may be operated to indicate at a distance and integrate the flow of fluids.

In accordance with my invention in one of its preferred forms, I provide at the transmitting end a toroidal or circular rheostat and a rotatable diametral arm carrying brushes at the ends through which direct current is supplied to the toroidal rheostat. At the receiving end, a toroidal winding is provided having a transversely magnetized coaxial rotor of high-coercive force magnetic material carrying an indicating pointer. Corresponding points around the periphery of the toroidal rheostat and the toroidal winding are connected by conductors extending between the transmitting and receiving stations.

The invention will be understood more readily from the following detailed description when considered in connection with the accompanying drawing and those features of the invention which are believed to be novel and patentable will be pointed out in the claims appended hereto. In the drawing, Fig. 1 is a circuit diagram representing schematically one form of my invention; Fig. 2 represents a modified form of transmitting instrument for transmitting straight line indications or for use in converting straight line motion into circular motion; Fig. 3 represents a modification of the arrangement of Fig. 4 for transmitting angular indications having a maximum range of less than 360 degrees or for use in converting fractional revolutions into complete revolutions; Fig. 4 represents a modified form of my telemeter receiver; Fig. 5 is a diagrammatic representation of rectilinear motion transmitter which I have devised for causing the receiver to make a plurality of revolutions; Fig. 6 is a diagrammatic representation of a modification of the arrangement of Fig. 5 in the form of a drum type transmitter for multiplying the transmitter rotation several times at the receiver; and Fig. 7 is a diagrammatic representation of another modification for multiplying the transmitter rotation several times at the receiver.

Fig. 1 illustrates the application of my invention to the remote indication of pressure. A Bourdon tube pressure gage 11 has a movable element 12 connected to a movable arm 13 of a telemetric transmitting instrument 14. The instrument 14 includes an annular rheostat 15 which may conveniently be wound upon a toroid or upon an annulus. The movable arm 13 carries a pair of contact blades or brushes 16 which are insulated from each other and which contact at the ends with two diametrically opposite points in the rheostat 15. The arm 13 lies along a diameter of the rheostat 15 and is rotatable about the center thereof in response to deflection of the Bourdon tube gage 11. A suitable source of direct-current 17 is connected to the brushes or contacts 16.

At the receiving station, there is a receiving instrument or indicator comprising a field or stator winding 18 and a permanent magnet armature or rotor 19. The winding 18 is divided into not less than three coils 20, 21 and 22 which, in the arrangement of Fig. 1, are connected in series to form a toroidal winding with not less than three terminals or taps 23, 24, and 25 at equidistant points around the periphery of the toroidal winding 18. The terminals 23, 24, 25, are connected to corresponding terminals 28, 26, and 27, which are connected to points equidistant around the periphery of the annular rheostat 15.

The armature 19 is preferably substantially cylindrical in shape or has a substantially circular cross section conforming in shape to the inner surface of the winding 18 and is substantially coaxial therewith. The armature 19 is transversely magnetized and, for the sake of maximum torque and retention of strength, it is composed of a high coercive force magnetic material. In order to minimize vibration of the armature and provide adequate damping, a damping ring 29 of copper or other current-conducting material is interposed between the armature 19 and the winding 18. The damping ring 29 may be of any desired axial length. I have obtained satisfactory results in constructions where its axial length is about 50 per cent greater than that of the rotor 19. For the purpose of increasing both the deflection-producing torque and the damping and for adequately shielding the receiver from stray magnetic fields, I may provide a core 30 for the winding 18 composed of a magnetic material having a high permeability and low hysteresis, for example, such as a nickel-iron alloy containing approximately 78½ per cent nickel. The use of low-hysteresis material prevents sluggishness or lag of the armature due to stator losses and contributes to the extremely rapid responsiveness of telemeter systems employing my receiver.

The core 30 may be composed of flat rings or annular laminations, the axial length of the core 30 being preferably substantially no less than the axial length of the rotor 19. I have found that satisfactory shielding is obtained when the rotor 19 and the core 30 have substantially the same axial length. The core 30 serves the dual purpose of shielding the instrument against external fields and guiding the stator flux to diametrically opposite points of the stator so as to cross the air gap diametrically. It will be observed that the rotor 19 conforms substantially in shape to the opening within the annular core 30.

The armature 19 may be composed of a high coercive force material such as cobalt steel or an alloy of iron and six to fifteen per cent aluminum and twenty to thirty per cent nickel, for example. However, for the sake of obtaining increased lightness, reduction in inertia, elimination of the necessity for insulation, and for obtaining maximum efficiency of utilization of magnet material, I prefer to employ a material such as that described in the copending application of Ralph G. Arey and Harold T. Faus, Serial No. 50,508, filed November 19, 1935, and assigned to the same assignee as the present application. When composed of this material, the rotor consists of a solid unlaminated block of circular cross section which is polarized across a diameter thereof. The material is prepared and magnetized as follows:

Mix together finely powdered magnetite, ferric oxide, and cobaltic oxide in the proportions of 43.6% magnetite, 30.1% ferric oxide, and 26.3% of cobaltic oxide. Mold the mixture in the shape desired under pressure of from three to five tons per square inch. Remove from mold and heat in an atmosphere of nitrogen or air for two or three hours at about 1000 degrees C. and allow to cool. Then reheat to about 520 degrees C. in a special furnace placed in the air gap of a direct-current electromagnet with a field of about 3000 H. With the field on, lower the temperature to about 300 or 320 degrees C. and hold in the field within this range of temperature for about three-quarters of an hour. Then allow to cool in the field to below 100 degrees C. The material may then be machined or ground to shape, if necessary. An unusual property of this material which I have discovered and which makes it particularly suitable for telemetric receiving is that although it may be magnetized in a given transverse direction while hot it is virtually impossible thereafter to shift the line of magnetization to a different angle without raising the temperature to about 300 degrees. It is believed that the materials described in United States Patents No. 1,997,193 and No. 1,976,230 to Kato et al. will also be useful for the rotor material on some forms of the apparatus although I have found that the sintered oxide material which I have described, produces telemeter receivers with the best performance.

Such material after being magnetized, in addition to being a permanent magnet of exceptionally high coercive force and adequate, although lower, residual induction than some of the common permanent magnet materials, has other remarkable properties. It has a resistance between 600,000 and 1,000,000 ohms per cm. cube and is thus practically an insulator. It is hard and of a gray slate color. It is very light in weight as compared to other magnetic materials, having a specific gravity of approximately one-half that of ordinary steel. The coercive force of the material prepared as previously described is between 700 and 1000 oersteds and has a residual induction of about 2000 lines per square centimeter. The available magnetic energy of the material per unit volume is approximately 1,000,000 measured in terms of the maximum value of the product of flux density and field strength in lines per square centimeter or gausses and in gilberts per centimeter respectively. Accordingly, the ratio of the magnetic energy per unit volume to the specific gravity or the magnetic energy per unit mass is over 2,000,000 measuring specific gravity in terms of that of steel. Likewise the ratio of residual induction to specific gravity exceeds 4000.

Since the line of polarization is very definite and fixed and does not shift, the scale need not be recalibrated and reset in case the windings should be deenergized and reenergized with the rotor in a different position. As a cylindrical magnet composed of the sintered oxide material behaves just as if it were a thin line permanent magnet, the position assumed by the pointer is very definite and the exact position may be relied upon as an accurate indication of the measurement transmitted.

I prefer to make the diameter of the rotor about twice its axial thickness as this appears to represent approximately the most efficient design of permanent magnet for the shape and material used. In order to give a clearer understanding of this statement, it may be said that the most efficient design of a cobalt steel bar magnet is one having a ratio of length to diameter of bar of about 8 to 1. Due to the higher coercive force and lower residual induction of the sintered oxide material used in my rotor, the most efficient design of a bar magnet made thereof is one where the ratio of length to diameter is about 2 to 1. It thus becomes evident that the solid cylindrical rotor of sintered oxide having a diameter about twice its axial thickness and polarized across a diameter thereof is an efficient permanent magnet which lends itself much more readily to a compact design with minimum leakage than would a rotor which cannot efficiently occupy but a small fraction of the total space included within the annular stator. It will be seen that in the arrangement of Fig. 1, the total length of air gap between the rotor 19 and the core 30 is more than one-fourth, in fact, nearly one-half the diameter of the rotor 19. Since the core is composed of permeable material relatively little magneto-motive force is required to pass flux through it, and the drop in magnetic potential occurs practically entirely across the air gap. The magnetic energy and residual magnetization of the sintered oxide rotor is so high that a minimum flux density in the air gap of 250 gausses due to the rotor may readily be maintained thus providing very powerful and positive damping action as well as high torque with the greater part of the magnetomotive force produced by the rotor.

Although I have shown a toroidal form of winding at 18 in Fig. 1 which may be with or without a core, it will be understood that my invention is not limited to this precise arrangement and that I may also employ separate coils or concentrated windings. For example, in the arrangement of Fig. 4, the stator winding of the receiving instrument comprises coils 20', 21', and 22' which link the core 30 and form a winding concentrated in three separate parts and tapped by terminals located between adjacent parts. In the arrangement of Fig. 4, the total length of the air gap between the rotor 19 and the core 30 is between 1¾ times and twice the diameter of the rotor 19.

In the arrangement of Fig. 4 the coils 20', 21', and 22' are preferably adjustably mounted upon the core 30 in order that any desired slight modification in scale distribution may be effected by sliding one or more of the coils circumferentially along the core. In this way quantity production is facilitated without impairment of accuracy of scale indication, since although printed scales are used the response of the pointer may be corrected to conform to the uniform scale in case it should be necessary to compensate for slight manufacturing or assembling inequalities in the coils or cores. If desired, compensation may also be obtained by winding or unwinding a fractional turn from one coil onto another while changing the points of connection of the terminals located between adjacent coils. In the arrangement of Figures 1 and 4 the field winding consists of a plurality of coils or helical winding portions arranged along an annulus so that they are placed around the center of the field winding and have the helix axes perpendicular to radii from said center. The individual coils produce magnetomotive forces which would tend to act tangentially around said center within the coils. However, combined the coils produce resultant magnetomotive force diametrically across the entire field winding.

The manner of operation of the apparatus will be apparent from the consideration of the fact that, as the arm 13 is rotated, the polarities and relative magnitudes of the voltage drops in the three sectors of the rheostat 15 will be varied. The voltages applied to the coils 20, 21, and 22 will produce fluxes in the core 30 which combine to produce a resultant magnetomotive force in a particular direction, depending upon the position of the movable arm 13. For example, in the position shown, the voltages applied to the coils 21 and 22 are equal and produce flux of the same polarity as the voltage applied to the coil 20. The magnetomotive force produced in the receiver will accordingly be in a horizontal direction and the rotor 19 will assume the position in which its line of magnetization is also horizontal. As the arm 13 is rotated in a counterclockwise direction, the voltage applied to the coil 22 will increase whereas that applied to the coil 21 will decrease, causing the direction of the resultant flux in the receiver to rotate with the arm 13.

Inasmuch as the connections of the transmitter and receiver are symmetrical with respect to a transverse line between them, it will be apparent that the angular positions of the arm 13 and the pointer 31 will also be symmetrical and the pointer 31 will rotate in a clockwise direction as the arm 13 rotates in a counterclockwise direction and vice versa. The annular stator core 30 which may be used with the arrangements of Figures 1 and 4, it will be observed, is smooth and toothless so that the flux paths vary smoothly as the armature is rotated, and consequently the rotation takes place smoothly without jerkiness or jumping. Since the taps and windings on the transmitter and receiver are radially symmetrical with respect to their respective axes, the rate of rotation of the pointer 31 is substantially uniform throughout its path of rotation. The angular direction of the diametrical stator flux varies smoothly and precisely as the arm 13 is rotated to vary the current ratios and polarities in the stator coils, and the rotor flux is unaffected by rotation since the reluctance of its magnetic circuit, primarily the air gap reluctance, is the same for all angular positions.

In connection with the transmission of certain types of indications, such as the height of a float 11' in a liquid level indicator, it is more convenient to employ a rectilinear motion transmitter arranged to have its contacts move in a straight line instead of utilizing a rack and pinion to convert the motion into rotation as would be required in the case of a rotary transmitter, such as the instrument 14 in Fig. 1. In order to obtain such straight line action I may employ a transmitter of the type illustrated in Fig. 2 in which the resistor 15 of Fig. 1 is replaced by a special rheostat including two straight resistors 33 and 34 tapped at suitable points for connection to the terminals 26, 27, and 28 from which suitable conductors lead to corresponding receiver terminals 24, 25, and 23, as in the arrangement of Fig. 1. In the arrangement of Fig. 2, the ends of the resistor 33 are connected together and the ends of the resistor 34 are connected to the midpoint 36 of the resistor 33. For a substantially uniform scale distribution, the arrangement of Fig. 2 has a terminal 28 connected at the lower end of the resistor 34, the terminal 26 connected one-third of the way up on resistor 34, and the terminal 27 connected two-thirds of the way up on the resistor 34. A tap one-sixth of the way up on resistor 33 is likewise connected to the terminal 27 and a tap five-sixths of the way up on resistor 33 is likewise connected to the terminal 26. It will be understood, however, that the location of the taps may be varied when it is desired to change the scale distribution.

The movable arm 13', in this case adapted for straight line up and down motion, carries contacts 16 connected to a source of direct current 17 and the contacts are adapted to slide along the resistors 33 and 34 corresponding to the action in Fig. 1. As the contacts 16 slide up and down the resistors 33 and 34, the polarities of the voltage applied between the terminals 26, 27, and 28 will vary in a manner analogous to that explained in connection with Fig. 1.

If it is assumed that the sliding arm 13' is initially at the lowermost position and the contacts 16 at the lower ends of the resistors 33 and 34, the potential of the terminal 28 will have its maximum negative value since the right-hand one of the contactors 16 is connected to the negative terminal of the source 17. As the sliding arm moves towards the half-way position, the potential of the terminal 28 becomes less negative and more positive until the arm 13' reaches the half-way position in which the left-hand contact 16 is at the mid tap 36. In this position, the left-hand or positive terminal of the source 17 is connected through the conductors 37 and 38 to the terminal 28, the potential of which accordingly has its maximum positive value. Then, as the arm 13' moves toward the top, the terminal 28 becomes less positive and more negative until, with the arm 13' in the uppermost position, the terminal 28 is again at the maximum negative potential since the right-hand or negative terminal of the source 17 is now connected through the conductor 38 directly to the terminal 28. The potential of the terminal 28 has thus completed a cycle similar to that of a sine wave but tending to be triangular in shape.

The terminals 26 and 27, which are at the one-third and two-thirds points from the lower end of the resistor 34, go through similar variations of potential but at times when the contactor is respectively one-third and two-thirds of the way toward the upper end of the resistor 34. Inasmuch as the terminal 28 goes through a complete voltage cycle when the contactor moves from the lower end to the upper end of the resistor 34, this movement corresponds to 360 electrical degrees. The terminal 26 goes through similar potential variations one-third of the distance later and this, therefore, corresponds to 120 electrical degrees later. Similarly, terminal 27 goes through its potential variations 240 degrees later than the terminal 28. The three terminals 28, 26 and 27, therefore, behave like a three-phase system and, when connected to the receiver or indicator of Fig. 1, produce rotation of the armature 19. It is thus apparent that the motion of the arm 13' the full length of the resistors 33 and 34 is converted into a complete rotation of the pointer 31 (Fig. 1).

If one of the resistors of Fig. 2, for example, the resistor 33, is turned end for end and the two resistors are bent into arcs, as illustrated in Fig. 3, the arrangement may be employed for converting a rotation of the arm 13 through an angle less than 360 degrees into rotation of the pointer 31 through a full 360 degrees. In the specific arrangement shown, the resistors 33' and 34 occupy arcs somewhat less than 180 degrees in length and, accordingly, a given angular rotation of the arm 13 causes the pointer 31 to rotate through slightly more than double such angle.

I have devised a transmitter for producing any desired number of revolutions of the receiver rotor in response to a given degree of motion of the transmitter mechanism. In the arrangement of Fig. 5 there are two resistors 41 and 42 and a pair of brushes 16 carried by mechanism, not shown, designed to move in a straight line along the resistors 41 and 42 in response to a motion which is to be indicated at a distance. Each resistor has its ends connected together. The resistors are divided into a plurality of equal-resistance parts or divisions by taps and cross connections between the taps of the two resistors are made. The number of parts into which the resistors are divided is the product of the number of revolutions of the receiver rotor to be produced and the number of conductors connected between the transmitter and the receiver.

In the transmitter illustrated in Fig. 5, the design is for producing three revolutions of the rotor 19 in response to movement of the brushes the full length of the resistors 41 and 42, and three leads 43 are run to the receiver as in Fig. 1. Accordingly, the resistors 41 and 42 are each divided into nine parts. In the case of the receiver 42 the first tap or connection is at the end of the resistor and the remaining taps are spaced along the resistor at distances apart, each representing one-ninth of the resistance of the resistor. In the case of the resistor 41, however, the first tap or connection is at a point spaced at a distance from the end of the resistor representing one-eighteenth of the resistance thereof. The remaining taps are spaced along the resistor at distances apart each representing one-ninth of the resistance of the resistor so that the two end portions of the resistors 41 together represent one of the nine parts into which the resistor 41 is divided. Each tap of each resistor is connected to taps of the same resistor spaced away along the resistor one-third the length thereof and is also connected to taps of the other resistor spaced one-sixth resistor length away, i. e., spaced away the length of one and one-half resistor parts or divisions. For identification the taps of the resistor 42 are numbered 1 to 10 inclusive, and the taps of the resistor 41 are lettered A to I, inclusive. Connections are made between taps 1, B, 4, E, 7, H and 10, between taps 2, C, 5, F, 8 and I, and between taps A, 3, D, 6, G and 9. Any three adjacent taps of either resistor such as the taps 1, 2 and 3 are connected to conductors such as conductors 43 leading to the receiver, e. g., to the terminals 23, 24 and 25 of Fig. 1.

It will be observed that there are as many series of connections between taps as there are conductors 43 leading to the receiver, and that each series of connections joins resistors separated by a number of resistor divisions equalling the number of current-transmitting conductors and also connects to each adjacent pair of connected taps on one resistor the tap on the other resistor spaced intermediate the said pair of adjacent connected taps. With respect to the arrangement illustrated in which the brushes 16 are even with each other and the ends of the resistors 41 and 42 are also even, it will be observed that the cross connections from one resistor to the other join an adjacent connected pair of taps of one resistor to a tap of the other resistor which is displaced from either of the said pair of connected taps of one resistor one-half the distance between said pair of connected taps.

As the brushes 16 are moved along the resistors 41 and 42 the voltage distribution and polarities in the adjacent division of the resistor are progressively varied and cause variation in the distribution and polarities of the currents in the conductors 43 leading to the receiver. These variations in current distribution cause rotation of the resultant magnetic field of the receiver and cause rotation of the pointer 31 as explained in connection with Fig. 1. However, in the arrangement of Fig. 5, the voltages and currents vary through a complete cycle each time the brushes 16 traverse a third resistor length, and the action takes place smoothly and progressively from one end of the resistor to the other. Consequently, the receiver pointer 31 is rotated three times by passage of the brushes 16 the entire length of the resistors 41 and 42. It will be understood that any desired greater number of revolutions may be produced by dividing the resistors 41 and 42 into a correspondingly greater number of parts or divisions and correspondingly increasing the number of taps and cross connections.

The electrical connections of the arrangement of Fig. 5 may also be employed in forming a compact drum type rotary transmitter for a telemeter system as represented in Fig. 6. In Fig. 6 the resistors 41 and 42 are shown as bent into circular shape to form endless or continuous resistors. The resistors and the brushes 16 are mounted so as to be relatively rotatable in response to rotary motion to be transmitted. With the connection shown in Fig. 6 the rotation is multiplied three times in the receiver, and any other desired degree of multiplication may be obtained by changing the number of parts into which the resistors are divided and correspondingly changing the number of taps and cross connections.

Multiplied rotation of the receiver may be produced also by utilizing a transmitter having a single endless resistor as shown in Figure 7. In the arrangement of Figure 7 an endless circular resistor 45 is employed which is divided into a number of parts or sections by taps, as in Figure 6, depending upon the number of conductors 43 extending to the receiver and the factor of multiplication desired. In the arrangement illustrated every third tap is electrically connected as in the arrangement of Figure 6. A pair of sliding-brush-carrying arms 46 and 47, connected to positive and negative terminals, respectively, of a direct current source 17 is provided, and the arms 46 and 47 are angularly spaced an amount depending upon the multiplication desired in the rotation of the receiver. In the arrangement illustrated in which three revolutions of the receiver are desired for each revolution of the transmitter arms 46 and 47, the arms 46 and 47 are spaced 60 degrees apart corresponding to 180 electrical degrees. If desired, there may be provided additional sliding-brush-carrying arms 48 and 49 electrically connected to the arm 46 and additional sliding-brush-carrying arms 50 and 51 electrically connected to the arm 47, the arms 48 and 49 being spaced 120 degrees or 360 electrical degrees from the arm 46, and the arms 50 and 51 being likewise spaced 120 degrees or 360 electrical degrees from the arm 47. It will be observed that in the embodiments of Figures 1, 4, 6 and 7 the transmitter and receiver are inherently adapted to make any desired number of revolutions and are not limited to any predetermined angular range.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A receiver for a telemeter system comprising in combination stator means for producing a diametric stator flux variable in angular direction in response to variations in the indication to be transmitted through the system, said stator having a smooth-surface core opening for receiving a rotor, and a substantially circular-cross-section rotor cooperating with said stator means with an axis of rotation substantially coaxial with its cross-section and with said stator means, said rotor being composed of sintered magnetic oxides and being magnetized transversely to its axis of rotation.

2. A receiver for a telemeter system comprising in combination stator means for producing a diametric stator flux variable in angular direction in response to variations in the indication to be transmitted through the system, said stator having a smooth-surface core opening for receiving a rotor, and a substantially circular cross-section rotor cooperating with said stator means with an axis of rotation substantially coaxial with its cross-section and with said stator means, said rotor being composed of sintered magnetite, ferric oxide, and cobaltic oxide substantially in a proportion of 43.6%, 30.1% and 26.3% respectively and being magnetized transversely to its axis of rotation.

3. A receiver for a telemeter system comprising in combination stator means for producing a diametric stator flux variable in angular direction in response to variations in the indication to be transmitted through the system, said stator having a smooth-surface core opening for receiving a rotor, and a substantially circular cross-section rotor cooperating with said stator means with an axis of rotation substantially coaxial with its cross-section and with said stator means, said rotor being composed of permanent magnet material magnetized transversely to the axis of rotation with a definite line of polarization.

4. A receiver for a direct-current telemetric system comprising a stator having a ring core with a smooth substantially circular opening therein, a current-conducting winding linking said core divided into groups of turns with taps between said groups, and a rotor occupying the opening in said stator core having a cross-section conforming substantially in shape to the opening in the stator, rotatably mounted substantially coaxially with said stator, and composed of high coercive force transversely magnetized permanent magnet material.

5. A receiver for a direct-current telemetric system comprising a stator producing a diametric flux which may be varied in angular direction in accordance with variations in indications to be transmitted over the system, and cooperating with said stator a substantially circular-cross-section rotatably-mounted rotor magnetized transversely to its axis of rotation and composed of a material capable of being magnetized in a given direction but highly resistant to having the line of magnetization changed thereafter to a different direction.

6. A receiver for a direct-current telemeter system comprising a stator having a core composed of relatively permeable magnetizable material carrying field producing windings and a substantially circular cross-section rotor rotatably mounted within said stator, said rotor being composed of permanent magnet material and being magnetized in a given direction transverse to its axis of rotation, the stator having a substantially circular cross-section opening therein for the rotor of sufficient size as to leave an air gap at least one-fourth as long as the dimension of the rotor along the line of magnetization, said rotor material having a coercive force of at least 400 oersteds.

7. A receiver for a direct-current telemetric system comprising a stator, and a rotor mounted rotatably within the stator, said rotor comprising high coercive force permanent magnet material magnetized transversely to its axis of rotation, said stator comprising a field winding divided into a plurality of coils and an annular member substantially coaxial with the axis of rotation of the rotor and composed of low hysteresis high permeability magnetizable material linking said field winding coils and serving both as a core therefor and as a magnetic shield for said receiver.

8. A receiver for a direct-current telemetric system comprising a stator with energizing means for producing a diametric flux which may be varied in angular direction in accordance with variations in indications to be transmitted over the system and a magnetic rotor cooperating with said stator, the strength of the stator energizing means and the magnetization of the rotor being so selected as to give the magnetic rotor a magnetomotive force exceeding the stator magnetomotive force.

HAROLD T. FAUS.